Aug. 27, 1963 M. H. SWEET 3,102,202
PHOTOMETRIC INSTRUMENTS
Filed April 12, 1960 5 Sheets-Sheet 1

MONROE H. SWEET
*INVENTOR.*

BY

ATTORNEY

MONROE H. SWEET
INVENTOR.

BY

ATTORNEY

MONROE H. SWEET
INVENTOR.

BY

ATTORNEY

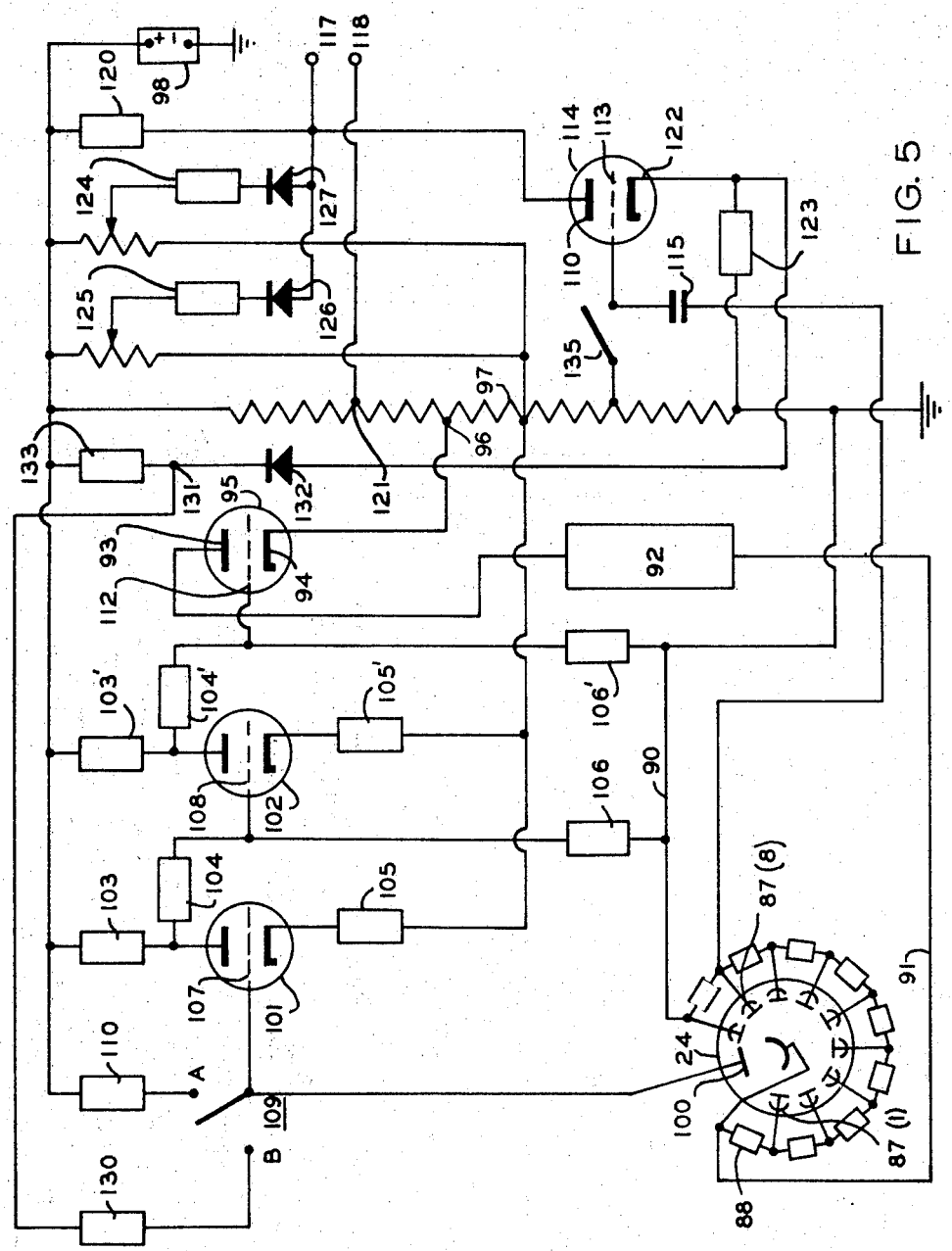

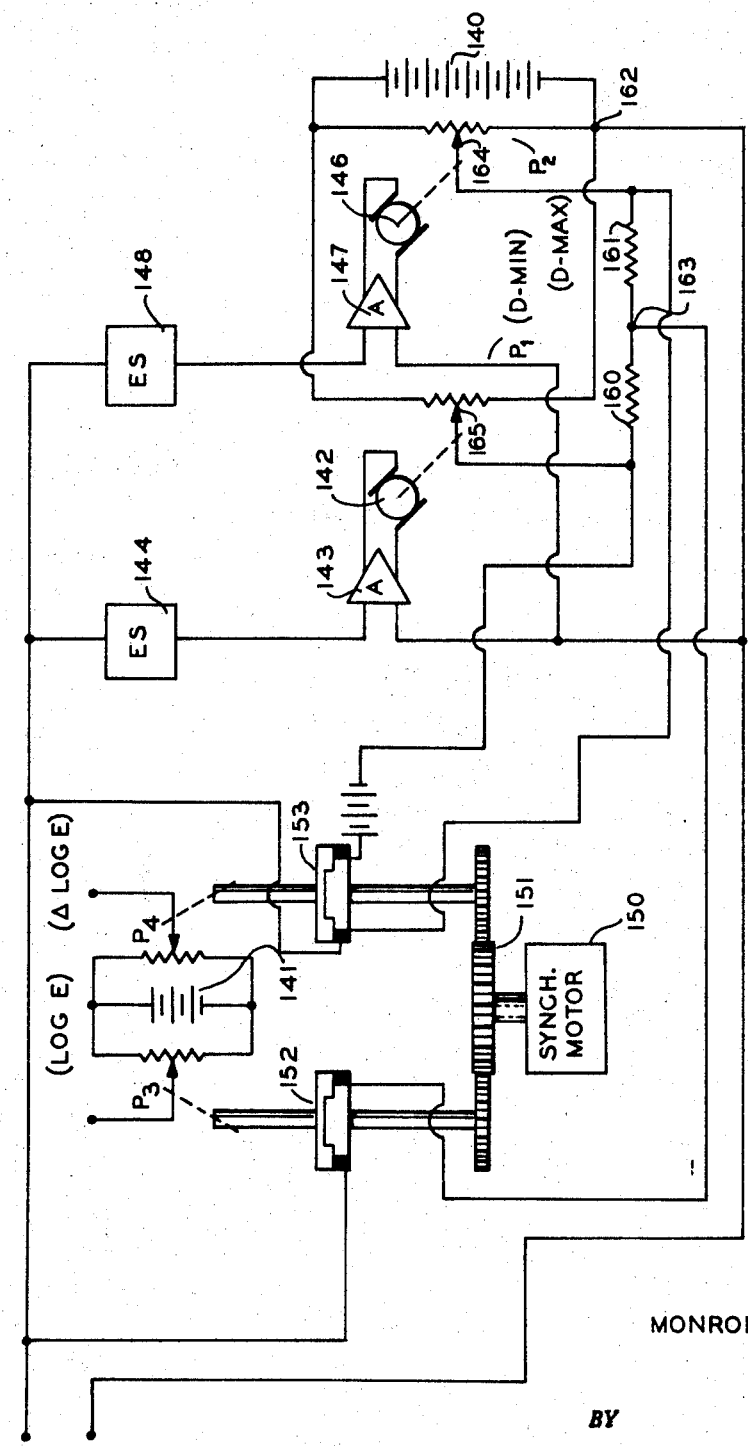

United States Patent Office 3,102,202
Patented Aug. 27, 1963

3,102,202
PHOTOMETRIC INSTRUMENTS
Monroe H. Sweet, Binghamton, N.Y.; Russell P. Easton and First-City National Bank of Binghamton, N.Y., administrators of said Monroe H. Sweet, deceased, assignors to General Aniline & Film Corporation, New York, N.Y., a corporation of Delaware
Filed Apr. 12, 1960, Ser. No. 21,827
4 Claims. (Cl. 250—207)

This invention relates to photoelectric sensitometric measuring apparatus and, more particularly, to improvements in apparatus for evaluating the density of photographic materials.

It is the primary object of this invention to provide an apparatus and system which will automatically evaluate a photographic sample as to desired characteristics thereof and indicate such characteristics.

It is a particular feature of this invention that certain mechanical components and electronic devices are so interrelated as to provide an analytical system which is versatile in its application and results in a unitized instrument.

It is a further object of this invention to provide an improved optical sensing device in the form of an illuminating head capable of transmittance and reflectance measuring applications.

It is another feature of the invention that a photomultiplier feed-back circuit is provided which extends the operational range of photomultiplier tubes heretofore used in similar apparatus and permits the evaluation of photographic densities up to a value of $D=6.0$.

Other objects and features will be apparent from the following description of the invention, pointed out in particularity in the appended claims and taken in connection with the accompanying drawings in which:

FIG. 5 is a schematic representation of the improved photomultiplier tube circuit; and FIG. 6 is a schematic representation of the analog computer.

In the art of photography and particularly in the manufacture of sensitized photographic materials, it is important to have measuring facilities which permit accurate and efficient evaluation and interpretation of the densities of test samples.

Various instruments have been devised for this purpose and, among these, densitometers constructed in accordance with the teachings of applicant's U.S. Patents 2,457,747; 2,478,163; and 2,492,901 have found large commercial acceptance.

The present invention represents various improvements directed toward constructional features and electronic circuits of the type of densitometers described in the above patents.

In the broader sense, the invention contemplates an overall measuring system based on improved mechanical components and electronic circuitry, incorporating an automatic feed for a test strip into the illuminating area and uniform illumination either through a translucent specimen or selectively onto the surface of an opaque specimen for reflection density evaluation. Switching means operable by the moving strip are provided at desired positions of its travel for initiating the actuation of motive means in an analog computer, whereby the light energy response of the photoelectric sensing element is computed in terms of desired characteristics while the strip under test completes its travel over the illumination area.

In addition, the system includes refinemenets in the circuitry of the photomultiplier tube operating on the single beam principle. The improved circuit permits continuous and automatic adjustments of the dynode voltage in the presence of changes in incident light and a nonlinear variation of the anode current with variation of dynode voltage, thereby effecting operation of the tube at higher sensitivity and over a wider range of flux level. This results in the extension of the useful range of the instrument to a density value of $D=6.0$.

Figure 1:
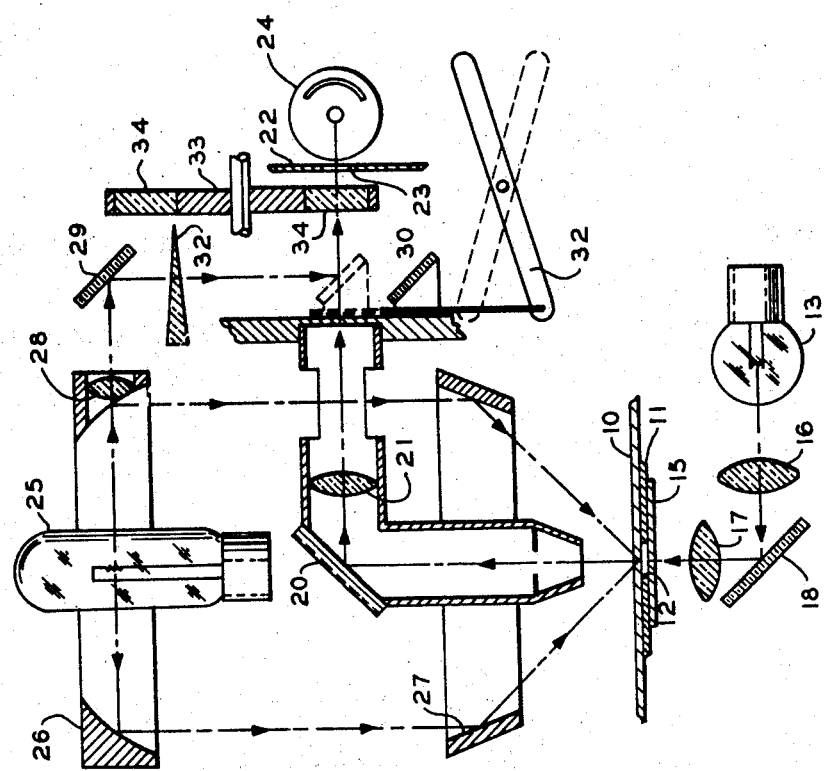
FIG. 1 is a schematic representation of the optical sensing device for the illumination of a specimen under test.
Figure 2:
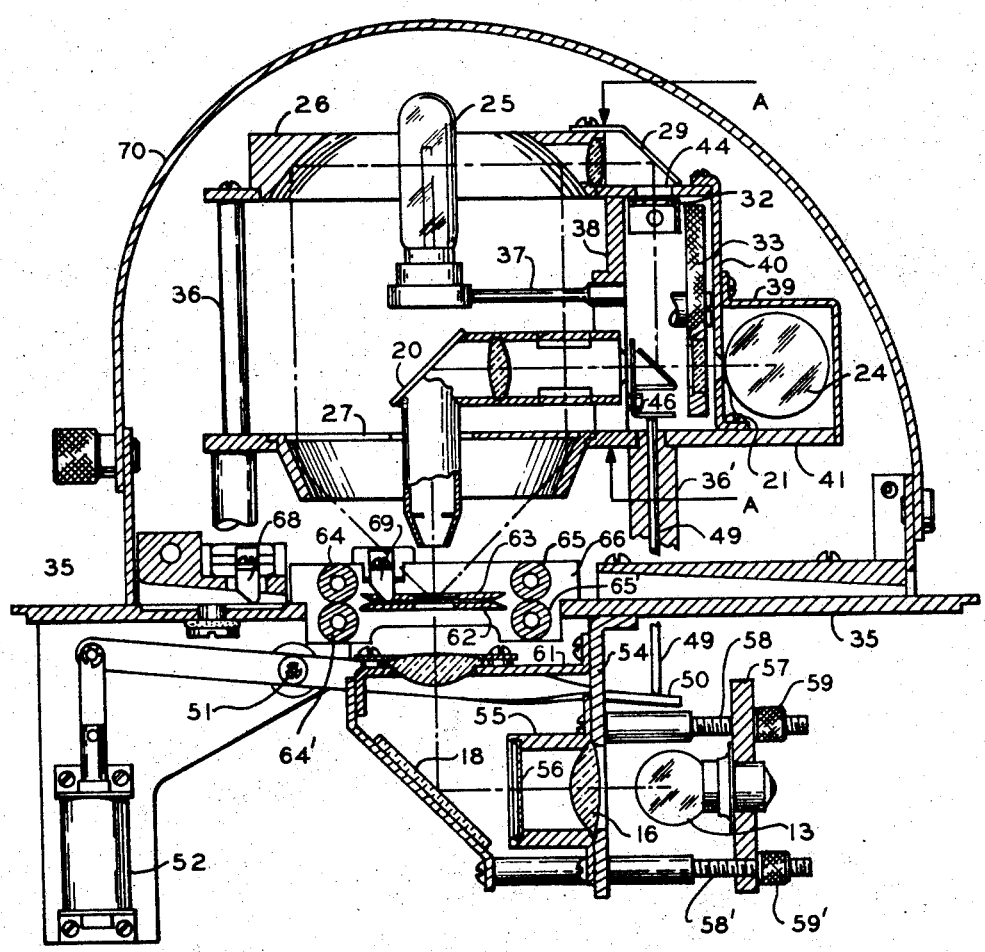
FIG. 2 is a side elevational view in cross section of the optical sensing device.
Figure 3:
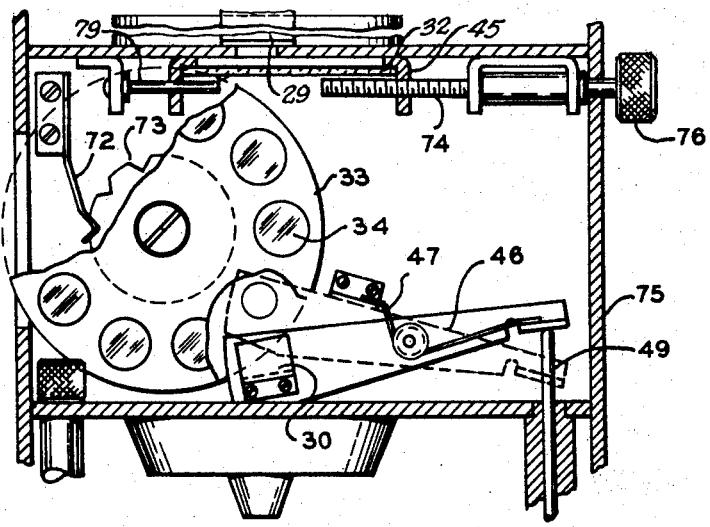
FIG. 3 is a partial view taken along line A—A of FIG. 2.
Figure 4:
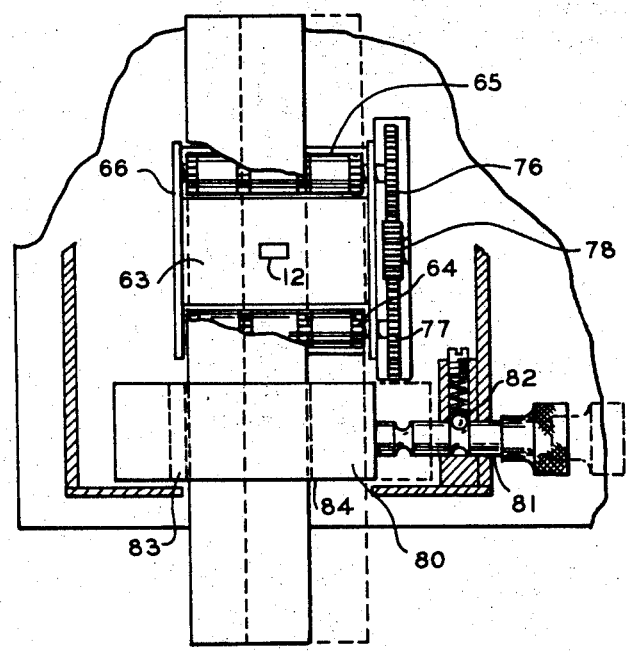
FIG. 4 is a partial view illustrating the strip feed mechanism.

Referring to the drawings, the optical sensing head of the instrument as to its operational features may best be seen in the schematic view of FIG. 1 while FIGS. 2, 3 and 4 illustrate the actual mechanical construction and assembly thereof.

As seen in FIG. 1, for transilluminating the specimen 10 which is placed on a support 11 having an aperture at 12, the lamp 13 is energized and its light flux is collected and focused on an opal glass plate 15 by the lenses 16 and 17 in cooperation with the plane mirror 18. The use of the latter permits a more advantageous physical placement of the lamp 13 in the assembly. The opal glass 15 functions as a diffusing element so that the transmitted light flux irradiates the test sample at all angles of incident.

The specularly transmitted component of the light flux is reflected from the plane mirror 20 and collected by the lens 21 and thus the image of the specimen 10 is focused in the plane of the exit aperture at 23 cut in the wall 22 so as to excite the phototube 24.

The lamp 25 placed coaxially with the concave annular mirror 26 is used as the light source when reflection analysis is to be made. The reflected light from the mirror 26 is collected by the simple annular mirror 27 which also focuses it on the specimen 10. The light reflected therefrom is collected by the same aforedescribed optical system as that for transmission measurement.

It is to be noted that in the case of transmission measurements, the optical flux reference for zero density is, of course, that received by the phototube when the sample is absent. In the reflection density mode of operation, the zero reference has been established as that of a perfectly diffused reflector of substantially 100% reflectance. Since there is no practical physical sample to represent this ideal, a small fraction of flux from the light source 25 is collected by the lens 28 and directed onto the photomultiplier tube 24 after reflection by plane mirrors 29 and 30. The lens 28 is conveniently placed in the wall of the mirror 26. An absorption wedge 32 is placed in the light path between mirrors 29 and 30 and is made adjustable so that the flux received by the phototube is of the same magnitude as that which would be received from an ideal zero density specimen. This beam is used to obtain the zero reference density signal.

Mirror 30 is carried on a lever arm 32 which may be operated in any desired manner. When the mirror 30 is placed in position for directing the light onto the phototube, it is also obstructing the passage of light from the light deflecting elements consisting of the mirror 20 and the lens 21. During transmission flux measurements, the mirror 30 is in the lower position.

Between the phototube 24 and the light beams emanating from either source there is placed a filter wheel 33 containing a series of filters 34 and 34' (shown here) which are used primarily for calibration checks. Since both the transmission and reflectance systems conform to established standards, a density reading of 1 would correspond to an attenuation of 90% in the zero density beam. Therefore, when the response of the recorder is adjusted to agree with the known values of the whole series of neutral density filters in the filter wheel, the operator is assured that the calibration of the instrument is correct.

A preferred embodiment of the mechanical construction of the optical sensing element is shown in FIGS. 2, 3 and 4. In these figures, identical reference characters are used to designate the same components appearing in FIG. 1. The assembly comprises a base plate 35 above which are mounted the component elements of the optical system previously described, namely, the annular mirrors 26 and 27 which are supported and spaced apart on posts 36 and 36'. The reflection light source 25 is held by a bracket 37 attached to the dividing wall 38. The phototube 24 is supported in a housing formed by the cover 39, the wall 40 of which is affixed to the support plate 41 and cover plate 42. The space between the walls 38 and 40 is utilized for the calibration light passage, the mirror 29 serving as a cover. The light reflected from the mirror 29 enters the aperture at 44 in the wall 42. The step wedge 32 is slidably supported in a carriage 45 attached to the wall 42. The mirror 30 is mounted on a pivoted plate member 46 biased by the spring 47. In the position shown in FIG. 1, the plate member 46 closes the exit opening of the transilluminating light path from the mirror 20. The member 46 is actuated by the pin 49 which is slidably supported in the post 36'.

The lever arm 50, pivoted at 51, is actuated by a solenoid 52 located underneath the base plate 35. The transilluminating light source is also positioned underneath the plate 35, being affixed thereto by the bracket 54 which also supports the housing 55 in which is mounted the lens 16 and filter glass plate 56. The lamp 13 is supported on the plate 57 which is slidably held on threaded studs 58 and 58' against knurled nuts 59 and 59'. The bracket 54 also supports at one end the mirror 18 which, at the other end, is attached to the transverse plate 61 supporting the lens 17.

Above the plate 61 and in a suitable cutout in the base plate 35 is placed the transport mechanism for the test strip consisting of the platens 62 and 63, one of which may be resiliently mounted so as to permit the entry of the strip between them and to exert sufficient pressure to hold it flat. A pair of co-engaging infeed rollers 64 and 64' and a pair of similar outfeed rollers 65 and 65' are mounted in a frame 66. The infeed rollers 64 and 64' are level with the base plate 35, the front portion of which, above the solenoid 52, serves as the infeed table for the test strip. At strategic locations in the path of the test strip are placed microswitches 68 and 69; the first of these is actuated by the edge of the strip prior to entry of the strip between rollers 64 and 64' and the other, namely, 69, is actuated prior to entry of the strip into the light path. The first of these switches starts the strip drive mechanism so that the infeed rollers grip the edge of the strip. The second switch may be utilized to start other equipment which has to run in synchronism with the movement of the strip, for example, an ink recorder for plotting a curve or a computer. A cover 70 attached to the base plate 35 encloses the entire assembly.

The arrangement of the parts for the support of the mirror 30, the wedge 32 and the filter disc 33 is shown in greater detail in FIG. 3. The disc 33 is preferably retained by spring 72 and cog wheel 73 so as to have the filters locked in position in front of the opening 23 in the wall 22. The carriage 45 of the wedge 32 is arranged to move over the pin 79 by means of the threaded shaft 74 which extends through the back wall 75 and may be turned by the knob 76.

The transport rollers 64 and 65 are seen in the view of FIG. 4. The rollers are interlinked by gears 76, 77 and 78, the latter being driven by a suitable motor (not shown here) which is actuated by the microswitch 68. A gate 80 is laterally displaced in two stop positions, being supported on sliding shaft 81 having notched portions which are retained by a spring-biased ball 82. The gate 80 has downwardly-extending slats 83 and 84 between which the test strip is guided so that in one position the left side and, in the other, the right side of the strip is passing over the light aperture 12.

The circuit for the operation of the photomultiplier tube 24 is shown schematically in FIG. 5. In basic details, this is similar to the circuits disclosed in the aforementioned patents except for the improvements effected in accordance with the present invention.

The dynode elements 87 are serially interconnected by resistors 88(1)–88(9), thus forming a voltage divider network between cathode 89 and the ground potential side of the system. This connection is effected by leads 90 and 91, the circuit being completed through the power source 92, anode 93, and cathode 94 of the first control tube 95 to the voltage tap point 96 of the voltage divider resistor 97 which connects across the terminals of another power source 98, the negative side of which returns to the common ground terminal. The current in this circuit is determined by the conductivity of the tube 95 which, in turn, establishes the voltage drop across the dynode resistors 88 and thus the effective dynode voltages.

The feed-back circuit for controlling the dynode voltage and thereby maintaining the anode current of the tube 24 substantially constant in the operating range of density $D=3$ is taken from the anode 100 through a two-stage, D.C. amplifier comprising vacuum tubes 101 and 102.

The amplifier circuit is conventional. The anode, grid, and cathode resistors 103, 104, 105 and 106, respectively, in the first stage, and similar resistors referenced with primary indices in the second stage, are proportioned to establish proper operating potentials for the vacuum tube elements. The grid 107 of the tube 101 is connected directly to the anode 100 of the multiplier tube 24 and also to the moving contact of a single-pole, double-throw switch 109 which selects the 0–3 or 0–6 density ranges of the instrument. In the position indicated at A, the switch 109 connects to the resistor 110 which, being connected to the positive terminal of the power source 98, functions as the anode load resistor of the multiplier tube 24.

Position A of the switch 109 establishes the 0–3 density range of the circuit in that the anode current of the multiplier tube is held substantially constant. This is effected by the control tube 95, the grid 112 of which, being connected to the output circuit of the amplifier tube 102 between resistors 104' and 100', regulates the current conductivity thereof and thus determines the dynode voltage, as mentioned before.

The signal voltage output of the photomultiplier tube 24 is taken from the dynode 87(8) and applied to the grid 113 of the output tube 114 through a coupling condenser 115.

In position B of switch 109, the anode 100 of the multiplier tube 24 as well as the grid 107 of the amplifier tube 101 connect to the load resistor 130 which returns to a supply voltage tap 131 at the junction point between the cathode of the diode 132 and the resistor 133, the latter terminating at the positive side of the power supply 98. The anode of the diode 132 connects to the cathode 122 of the output tube 114.

Referring to the operation of the circuit, when the light received by the photomultiplier tube is increased, the grid 107 of the tube 101 is momentarily driven more negative. This causes the anode potential of this tube to become more positive and, with it, the grid 108 of the tube 102. Therefore, the anode of the tube 102 is driven in a negative direction, carrying with it the grid 112 of the control tube 95. The dynode voltage controlled by this tube is reduced. This action reduces the sensitivity of the multiplier tube and restricts the anode current. An equilibrium anode current is reached almost instantaneously. The voltage gain of the two amplifier stages, comprising tubes 101 and 102, is relatively high. However, the cathode load resistors 105 and 105' provide sufficient degeneration to give excellent stability. The net result is that over the whole operating range of the circuit the potential of the grid 107 of the tube 101 is very nearly constant. Furthermore, since the operating conditions of the tube 101 are such that the grid current is negligible, the photomultiplier anode current is maintained very nearly constant.

The output signal is derived from the output tube 114. This is driven through the coupling condenser 115 by the voltage developed between dynodes 87(9), 87(8). Therefore, to a close approximation, the anode-cathode current of the tube 101 varies linearly with dynode voltage. In the standby condition, switch 135 is closed. This holds the grid 113 of the tube 114 at a constant value such as to give an anode load drop producing zero signal output. The effects of drift of the sensitivity of the photomultiplier tube and light output of the illuminating system as well as minor changes in efficiency of the optical system are eliminated during each standby switching cycle.

It was mentioned before that in the density range of 3, the operation was such that the anode current of the photomultiplier tube was held nearly constant. In the range of 6 which is obtained when the switch 109 is in position B, the anode current of the photomultiplier tube is varied deliberately in such a manner as to have a variation which is non-linear with dynode voltage variation.

This is obtained by the particular characteristics of the resistor 130 which is preferably a silicon carbide resistance element or one of similar material where the effective resistance varies inversely with current variations. The variation of current through the resistor 130 in accordance with changes in dynode voltage is obtained from the circuit which connects the load resistor 130 to the cathode 122 of the tube 114, this connection being effected, as stated before, through the diode 132. The latter operates as a zener diode to elevate the cathode voltage of the tube 122 to the reference level necessary to provide a bias for the load resistor 130.

The signal output, as mentioned before, is taken between terminal 117 connected to the anode 111 of tube 114 and terminal 118, connected to voltage tap 121, respectively, and is determined by the anode current of tube 114. A suitable indicating instrument may be connected to these terminals to indicate the voltage output in terms of density of the sample being tested. Preferably, for automatic operation, use can be made of an analog computer specifically designed for this purpose. Referring to FIG. 6, the simplified schematic circuit shows the analog computer which is designed to evaluate the sensitometric data of a test strip as it passes through the optical sensing head. This evaluation is based on a curve where density is plotted against log $E$ exposure. The sensitometric characteristics of a sample are defined, by way of example, by taking the photographic speed of the sample in terms of the log $E$ value $\omega$ corresponding to point C which represents on the curve a density $$\frac{D}{C} = \tfrac{1}{2}(D\ min. + D\ max.)$$

The partial exposure scale is defined as log $E\delta$ — log $E\beta$, where $\beta$ corresponds to $D\ min.+.02$ and $\delta$ corresponds to $D\ max.-.02$.

These values are determined automatically by the computer as the test strip is inserted, first starting with the minimum density portion and re-inserted starting with the maximum density portion.

The computer consists of four potentiometers $P_1$, $P_2$, $P_3$, and $P_4$, connected to voltage sources represented by batteries 140 and 141, respectively. Potentiometer $P_1$ is driven by the motor 142 through servo amplifier 143 actuated by the electronic switch 144. Similarly, $P_2$ is driven by the motor 146 through servo amplifier 147 actuated by the electronic switch 148. The potentiometers $P_3$ and $P_4$ are driven by the synchronous motor 150 through the gear train 151 and electrical clutches 152 and 153.

As the strip progresses through the measuring head, potentiometers $P_1$ and $P_2$ are balanced so as to provide a voltage equal to the output voltage between terminals 117 and 118. Immediately after the test strip enters the measuring beam, potentiometer $P_1$ is balanced; then its balancing motor is interrupted. The potentiometer output setting is therefore a measure of the minimum strip density (D min.). Potentiometer $P_2$ is connected in the circuit until just before the strip leaves the measuring aperture. At this instant, its balancing motor circuit is interrupted and its pickoff voltage is a measure of the maximum strip density (D max.).

Resistors 160 and 161 are of equal value and the voltage appearing between terminals 162 and 163 will be a measure of density $$\frac{D}{C}$$

The strip is now re-inserted in the measuring head in the reverse direction. The clutches 152 and 153 are energized so that the motor 150 will drive the potentiometers $P_3$ and $P_4$, whereas potentiometers $P_1$ and $P_2$ remain fixed by virtue of the disabling action of the electronic switches 144 and 148. The clutch 152 engages immediately upon insertion of the strip and releases when the output signal voltage reaches the value equal to the voltage between points 162 and 163. Consequently, the setting of the potentiometer $P_3$ is a negative measure of speed in terms of log $E$.

The clutch 153 engages only after the output signal voltage drops to a value equal to $D$ max.—0.2; that is, when the signal voltage drops to the value between points 162 and 164 representing the setting of potentiometer $P_2$ minus M, where M is a fixed voltage corresponding to .02 density. The clutch 153 releases when the signal voltage drops to a value between points 162 and 165 which is the setting of potentiometer $P_1$ plus M corresponding to $D$ min.+0.2. Therefore, the setting of potentiometer $P_4$ is a measure of the partial exposure scale.

From the data recorded on potentiometers $P_1$, $P_2$, $P_3$, and $P_4$, the sensitometric characteristics in accordance with $D$ versus log $E$ curve can be read directly.

Other desired characteristics may be obtained by different functional assignments of the potentiometers.

What is claimed is:

1. A control system for automatically varying the sensitivity of a photomultiplier tube by means of variation of dynode voltage, including an amplifier responsive to variations of the anode current of said multiplier tube, a first control tube associated with said amplifier, the current conductivity of said tube determining the effective dynode potential, impedance means in the anode circuit of said multiplier tube and a circuit including said impedance and a second control tube for varying current flow in said impedance in inverse relation to said dynode potential whereby the effective anode current of said multiplier tube is caused to vary in inverse relation to variation in said dynode voltage.

2. A control system for automatically varying the sensitivity of a photomultiplier tube by means of variation of dynode voltage, including an amplifier responsive to variations of the anode current of said multiplier tube, a first control tube associated with said amplifier, the current conductivity of said tube determining the effective dynode potential, impedance means comprising a non-linear resistance element in the anode circuit of said multiplier tube, and a second circuit including said impedance and a second control tube for varying current flow in said impedance whereby the anode current of said multiplier tube is caused to vary non-linearly in inverse relation to variations in said dynode voltage.

3. A control system in accordance with claim 2 wherein said second circuit comprises a source of potential, a vacuum tube having anode, cathode and a control electrode, a load resistance in series between said anode and one terminal of said source, a resistance between said cathode and the other terminal of said source, a connection including a unidirectional impedance between said cathode and one terminal of said non-linear resistance, and a connection including a capacitor between said control electrode and one of said dynode elements of said photomultiplier tube.

4. In a system for measuring the photographic density by means of indicating the variation of the dynode voltage of a photomultiplier tube upon being excited by light modified in accordance with a sample being tested, the improvement comprising a feed-back circuit between the anode of said multiplier tube and one of the dynode elements, said circuit including electronic control means for varying the anode current of said multiplier tube in inverse relation to the variation of voltage across said dynode element, and means for effecting said anode current variation at a non-linear relationship between predetermined limits.

References Cited in the file of this patent

UNITED STATES PATENTS

| | | |
|---|---|---|
| 2,146,904 | McFarlane et al. | Feb. 14, 1939 |
| 2,437,411 | Tuttle | Mar. 9, 1948 |
| 2,534,668 | Gunderson | Dec. 19, 1950 |
| 2,796,531 | Goodale | June 18, 1957 |
| 2,982,860 | Nehrbas et al. | May 2, 1961 |